United States Patent Office 3,632,691
Patented Jan. 4, 1972

3,632,691
DIOXYPHOSPHINYL METHYLIDES AND DIOXYPHOSPHINYL METHYLENES
Burton G. Christensen, Scotch Plains, and Raymond A. Firestone, Fanwood, N.J., assignors to Merck & Co., Inc., Rahway, N.J.
No Drawing. Filed May 15, 1968, Ser. No. 729,464
Int. Cl. C07f 9/40; A01n 91/36
U.S. Cl. 260—932
9 Claims

ABSTRACT OF THE DISCLOSURE

Disclosed are (dioxyphosphinyl)methylides and their corresponding methylene precursors; these compounds are substituted at the methylide and methylene carbon atoms respectively by a phosphinyl moiety or by a sulfonium, sulfoxonium, phosphonium or ammonium cation. The said (dioxyphosphinyl)methylides are last-stage intermediates which react directly with acetaldehyde to afford the corresponding esters of (cis-1,2-epoxypropyl)phosphonic acid; which esters may be converted to their antibiotically active salt and ester derivatives.

DESCRIPTION OF THE INVENTION

Preferred embodiments

This invention relates to a novel method for the preparation of (cis-1,2-epoxypropyl)phosphonic acid and its salts and ester derivatives by treating a (dioxyphosphinyl) methylide with acetaldehyde.

The (±) and (—) (cis-1,2-epoxypropyl)phosphonic acid product of the instant process and its salts are antimicrobial agents, which are useful in inhibiting the growth of gram-positive and gram-negative pathogenic bacteria. The (—) form, and particularly its salts such as the sodium and calcium salts, are active against Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (±) and (—) (cis-1,2-epoxypropyl)phosphonic acid and the salts thereof can be used as antiseptic agents to remove susceptible organisms from pharmaceutical, dental and medical equipment and can also be used in other areas subect to infection by such organisms. Similarly, they can be used to separate certain microorganisms from mixtures of microorganisms. The salts of (—) (cis-1,2-epoxypropyl)phosphonic acid are particularly valuable because not only do they have application in the treatment of diseases caused by bacterial infections in man and animals, but they are active against resistant strains of pathogens. The said salts constitute a preferred embodiment of this invention because they are effective when given orally, although it is to be noted that they can also be administered parenterally.

In accordance with this invention (cis-1,2-epoxypropyl)-phosphonic acid and its salts and ester derivatives (I, infra) are obtained by treating a (dioxyphosphinyl) methylide (II, infra) substituted at the methylide carbon by a leaving group, with acetaldehyde. Temperature is not critical to the success of the reaction but, in general, the process is most advantageously conducted by adding the acetaldehyde to the methylide reactant (II, infra) at a temperature above the freezing point of the solvent system as, for example, in the range of from about —20° C. up to about room temperature. Following the addition of aldehyde it is sometimes desirable to facilitate the reaction by the application of slight heating as, for example, by heating at a temperature slightly above room temperature up to about 150° C. The (cis-1,2-epoxypropyl) phosphonic acid ester (I) thus obtained can either be isolated per se a product of the invention or the said ester may be converted to (cis-1,2-epoxypropyl)phosphonic acid by hydrogenolysis, or by treatment with an aqueous solution of a mineral acid such as hydrochloric acid or sulfuric acid under carefully buffered conditions, or by treatment with trimethylchlorosilane followed by aqueous hydrolysis. The following equation illustrates the process of this invention:

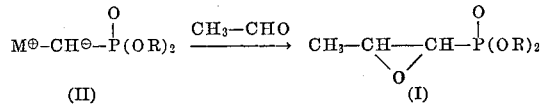

(II)  (I)

wherein R is alkyl, such as methyl, ethyl, n-propyl, isopropyl, n-butyl, n-amyl, iso-octyl and the like, lower alkenyl, such as allyl and the like, aryl such as phenyl, naphthyl and the like or aralkyl such as benzyl, phenethyl, menaphthyl and the like and $M^\oplus$ is di-lower alkoxyphosphinyl such as dimethoxyphosphinyl, diethoxyphosphinyl, di-n-propoxyphosphinyl and the like, di-aryloxyphoshinyl such as di-phenoxyphosphinyl and the like, di-aralkoxyphosphinyl such as di-benzyloxyphosphinyl and the like, a sulfonium cation of the formula $(R^1)_2S^\oplus$—, a sulfoxonium cation of the formula $(R^1)_2SO^\oplus$—, a phosphonium cation of the formula $(R^1)_3P^\oplus$— or an ammonium cation of the formula $(R^2)_3N^\oplus$—, where $R^1$ in each occurrence is lower alkyl such as methyl, ethyl, n-propyl, n-butyl, n-amyl and the like, aryl such as phenyl and the like, or aralkyl such as benzyl, naphthyl and the like, and $R^2$ is alkyl such as methyl, ethyl, n-propyl, n-butyl, n-amyl and the like or aralkyl such as benzyl and the like.

It is only necessary to add the acetaldehyde reactant to a solution of the (dioxyphosphinyl)methylide starting material (II) in order to effect elimination of the $M^\oplus$ moiety and bring about the formation of the epoxide product (I). However, in practice it is most desirable to prepare the (dioxyphosphinyl)methylide (II) reactant in situ by simply treating a halomethylphosphonate (IV, infra) with the appropriate reagent sulfide, amine, sulfoxide, phosphine or phosphite reagent followed by the reaction of the cationic intermediate (III, infra) thus obtained with a base such as sulfonylmethylide or sodium hydride to yield the desired (dioxyphosphinyl)methylide (II). The starting material (II) thus obtained is suitable for use directly in the process of this invention and can simply be mixed with the acetaldehyde to effect the synthesis of the desired (cis-1,2-epoxypropyl)phosphonic acid ester (I). The following equation illustrates this method of preparation:

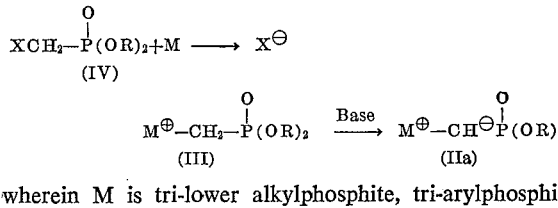

(IV)

(III)  (IIa)

wherein M is tri-lower alkylphosphite, tri-arylphosphite such as tri-phenylphosphite and the like, tri-aralkylphosphite such as tri-benzylphosphite and the like, di-lower alkylsulfide, di-arylsulfide such as di-phenylsulfide and the like, di-aralkylsulfide such as di-benzylsulfide and the like, di-lower alkylsulfoxide, di-arylsulfoxide such as di-phenylsulfoxide and the like, di-aralkylsulfoxide such as di-benzyl sulfoxide and the like, tri-lower alkylphosphine, tri-arylphosphine such as tri-phenylphosphine, tri-naphthylphosphine and the like, tri-aralkylphosphine such as tri-benzylphosphine and the like, tri-lower alkylamine, or tri-aralkylamine such as tri-benzylamine and the like, $X^\ominus$ is a halo anion such as is derived from chloro, bromo fluoro or iodo and M⊕, R₁, R¹ and X are as defined above.

The halomethylphosphonates (IV) employed as the starting materials in the foregoing equation are conveniently synthesized by several alternate routes. One such method of preparation consists in treating a halomethylphosphonic acid dihalide such as chloromethylphosphonic acid dichloride with a suitable alcohol, as, for example, with a lower alkanol or with a hydroxy substituted lower alkene, such as allyl alcohol and the like. The following equation illustrates this method of preparation:

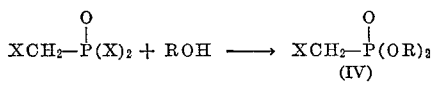
(IV)

wherein R and X are as defined above.

Alternatively, those halomethylphosphonate starting materials wherein the halo moiety is fluoro are conveniently synthesized by treating phosphorousoxychloride with a suitable alcohol in the presence of a base, such as triethylamine and the chlorophosphonate intermediate thus obtained is then treated with sodium fluoride to yield a fluorophosphonate derivative which is then caused to react with diazomethane to afford the desired fluoromethylphosphonate (V, infra):

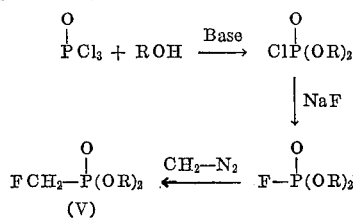
(V)

wherein R is as defined above.

Still another method for the preparation of the halomethylphosphonate precursors and one which is particularly suitable for preparing those compounds wherein the alcohol portion of the said ester is derived from an aralkanol such as benzyl alcohol consists in treating a tri-aralkylphosphite such as tribenzyl phosphite with methylene halide. The reaction is preferably conducted with the application of heat as, for example, by heating at the reflux temperature of the reaction mixtures:

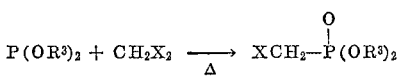

wherein R³ is aralkyl such as benzyl, phenethyl, menaphthyl, etc. and X is as defined above.

The nuclear carbons comprising the epoxide ring in the instant products are asymmetric in character and, therefore, the said products may be obtained in the form of one or more of four optically active isomers. In this connection it should be noted that (−) (cis-1,2-epoxypropyl)phosphonic acid and its salts are particularly effective in inhibiting the growth of pathogenic bacteria and, therefore, the preparation of that isomer constitutes a preferred embodiment of this invention.

The (−) (cis - 1,2 - epoxypropyl)phosphonic acid referred to herein rotates plane-polarized light in a counter-clockwise direction (to the left as viewed by the observer) when the rotation of its disodium salt is measured in water (5% concentration) at 405 mμ.

The designation cis used in describing the 1,2-epoxypropylphosphonic acid compounds means that each of the hydrogen atoms attached to carbon atoms 1 and 2 of the propylphosphonic acid are on the same side of the oxide ring.

The following examples illustrate the method by which (cis - 1,2 - epoxypropyl)phosphonic acid and its salts and ester derivatives (I) may be obtained. However, the examples are illustrative only and should not be construed as being limited thereto since other functionally equivalent reagents may be substituted therefor to yield an identical (cis - 1,2 - epoxypropyl)phosphonic acid and its salt and ester derivatives.

EXAMPLE 1.—DIETHYL (CIS-1,2-EPOXY-PROPYL)PHOSPHONATE

Step A: Diethyl chloromethylphosphonate

Chloromethylphosphonic acid dichloride (167.37 g., 1.0 mole) is added dropwise to ethanol (69.0 g., 1.5 mole) at 30° C. and 20 mm. pressure over a one hour period. After stirring for an additional two hours, the reaction mixture is brought slowly to 50° C. over a two hour period and the ethanol is removed by decreasing the pressure to 4 mm. The residue is then washed with a solution of aqueous sodium bicarbonate and fractionally distilled to yield diethyl chloromethylphosphonate.

Step B: (Diethoxyphosphinyl)dimethylsulfonium methylide

Dimethyl sulfide (20 ml.) is added to diethyl chloromethylphosphonate (10.0 g.) and the mixture is stirred for 24 hours at 25° C. Excess dimethyl sulfide is then removed by evaporation whereupon a residue identified as (diethoxyphosphinylmethyl)dimethylsulfonium chloride is obtained and the said intermediate is added to a solution containing one equivalent of sodium methylsulfonylmethylide in dimethyl sulfoxide (250 ml.) to yield (diethoxyphosphinyl)dimethylsulfonium methylide.

Step C: Diethyl (cis-1,2-epoxypropyl)phosphonate

To the solution of (diethoxyphosphinyl)dimethylsulfonium methylide obtained according to Step B is added one equivalent of acetaldehyde while maintaining the reaction mixture at 0° C. The mixture is then warmed to 25° C. over a one hour period, poured into ice water and extracted three times with ether. The combined ether extracts are then dried over sodium sulfate and evaporated to yield diethyl (cis-1,2-epoxypropyl)phosphonate.

EXAMPLE 2.—(CIS-1,2-EPOXYPROPYL)PHOSPHONIC ACID AND DISODIUM SALT

Step A: Diethyl chlorophosphonate

A solution of ethanol (9.2 g., 0.2 mole) in triethylamine (20.8 g., 0.2 mole) is added slowly to a cooled solution of phosphorous oxychloride (15.3 g., 0.1 mole) in benzene (100 ml.). The reaction mixture is then filtered and the filtrate vacuum distilled to yield diethyl chlorophosphonate.

Step B. Diethyl fluorophosphonate

A mixture of diethyl chlorophosphonate (34.4 g., 0.2 mole) and anhydrous sodium fluoride (19.74 g., 0.47 mole) in benzene (175 ml.) is refluxed for two hours. The mixture is cooled, filtered, the solvent removed and the residue distilled to yield diethyl fluorophosphonate.

Step C: Diethyl fluoromethylphosphonate

To a solution of diethyl fluorophosphate (10.0 g., 0.064 mole) in ether (50 ml.) is added a solution of diazomethane (3.36 g., 0.08 mole) in ether (50 ml.) at 0° C. The mixture is stirred for three hours at 0° C. and then the solvent is removed under vacuum. The residue is then distilled in vacuo to yield diethyl fluoromethylphosphonate.

Step D: (Diethoxyphosphinyl)trimethylammonium methylide

Trimethylamine (20 ml.) is added to diethyl fluoromethylphosphonate (10.0 grams) in dimethyl sulfoxide and the solution is stirred for 24 hours. Excess trimethylamine is evaporated in vacuo whereupon a crystalline solid identified as (diethoxyphosphinylmethyl)trimethylammonium fluoride is obtained and to this intermediate is added one equivalent of sodium methylsulfonylmethylide in dimethyl sulfoxide (200 ml.) and the mixture stirred for eight hours at 30° C. to yield (diethoxyphosphinyl)trimethylammonium methylide.

Step E: Diethyl(cis-1,2-epoxypropyl)phosphonate

To the solution of (diethoxyphosphinyl)trimethylammonium methylide obtained according to Step D is added one equivalent of acetaldehyde slowly at 0° C. over a three hour period, and the mixture is then heated over three hours to 150° C., cooled, stripped in vacuo, poured into ice water and extracted three times with ether. The combined ether extracts are then dried over sodium sulfate and evaporated to yield diethyl (cis-1,2-epoxypropyl) phosphonate.

Step F: (Cis-1,2-epoxypropyl)phosphonic acid and disodium salt

Diethyl (cis-1,2-epoxypropyl)phosphonate (1 m. mole) in trimethylchlorosilane (10 cc.) is refluxed for eight hours and the reaction mixture is extracted with water to yield an aqueous solution of (cis-1,2-epoxypropyl)phosphonic acid. The product thus obtained is then treated with two equivalents of sodium hydroxide and the solution evaporated to yield disodium (cis-1,2-epoxypropyl) phosphonate.

EXAMPLE 3.—DIBENZYL (CIS-1,2-EPOXYPROPYL) PHOSPHONATE AND MONOTRIETHYLAMMONIUM SALT OF (CIS-1,2-EPOXYPROPYL)PHOSPHONIC ACID

Step A: Dibenzyl iodomethylphosphonate

Tribenzyl phosphite (0.5 mole) and methylene iodide (0.75 mole) are heated together in a distillation flask for about two hours or until methyl iodide ceases to distill out. After stripping out excess methylene iodide in vacuo, the residue is subjected to vacuum distillation to afford dibenzyl iodomethylphosphonate.

Step B: (Dimethoxyphosphinyl)dimethylsulfoxonium methylide

Dibenzyl iodomethylphosphonate (10.0 g.) and dimethylsulfoxide (100 ml.) are heated for 24 hours at 150° C. Excess dimethylsulfoxide is removed in vacuo and the mixture is then cooled, filtered, washed and dried to yield crystalline (dimethoxyphosphinylmethyl) dimethylsulfoxonium chloride. The said intermediate (0.23 mole) is then added slowly with stirring to freshly prepared sodium methylsulfonylmethylide, obtained by treating a 60% sodium hydride dispersion in mineral oil (8.8 g., 0.22 mole) with dimethylsulfoxide (250 ml.). There is then obtained a solution of (dimethoxyphosphinyl) dimethylsulfoxonium methylide.

Step C: Dibenzyl (cis-1,2-epoxypropyl) phosphonate

To the solution of (dimethoxyphosphinyl)dimethylsulfoxonium methylide obtained according to Step B is added acetaldehyde over a five minute period at 0° C. The mixture is stirred for 15 minutes at room temperature, then for 30 minutes at 60° C. and is then poured into ice water and extracted twice with ether. The combined ether extracts are then dried over sodium sulfate and evaporated to yield dibenzyl (cis-1,2-epoxypropyl)phosphonate.

Step D: Mono-triethylammonium salt of (cis-1,2-epoxypropyl)phosphonic acid

To a solution of dibenzyl (cis-1,2-epoxypropyl)phosphonate (0.1 mole) and triethylamine (0.1 mole) in 200 ml. of ethanol is added 10–15 g. of Raney nickel and the mixture is shaken with hydrogen under 40 p.s.i. at room temperature until hydrogen uptake is essentially complete. The reaction mixture is then filtered free of catalyst and the filtrate concentrated to yield monotriethylammonium (cis-1,2-epoxypropyl)phosphonate.

Step E: (Cis-1,2-epoxypropyl)phosphonic acid

Alternatively, the benzyl groups in the dibenzyl (cis-1,2-epoxypropyl)phosphonate obtained according to Step C may also be cleaved and the said ester converted to the free acid by catalytic hydrogenation in the presence of palladium. Thus, the dibenzyl (cis-1,2-epoxypropyl)phosphonate (0.1 mole) in ethanol (100 ml.) may be hydrogenated over a 5% palladium on charcoal catalyst (1.00 g.) at atmospheric pressure and 25° C. Following uptake of 0.2 mole of hydrogen the mixture is filtered and the filtrate concentrated to dryness under vacuum to yield (cis-1,2-epoxypropyl)phosphonic acid.

Upon substituting dibenzylsulfoxide and diphenylsulfoxide for the dimethylsulfoxide recited in Step B of the foregoing example and following the procedure described in Steps B and C therein, the intermediates (dimethoxyphosphinyl)dibenzylsulfoxonium methylide and (dimethoxyphosphinyl)diphenylsulfoxonium methylide, respectively, are obtained, which intermediates can be treated according to the method described in Steps C, D and E to yield dibenzyl (cis-1,2-epoxypropyl)phosphonate and the corresponding mono-triethylammonium salt and free acid derivative thereof.

EXAMPLE 4.—DIPHENYL (CIS-1,2-EPOXYPROPYL)PHOSPHONATE

Step A: Diphenyl chloromethylphosphonate

By substituting an equivalent amount of phenol and an aqueous solution of sodium carbonate for the ethanol and sodium bicarbonate solution, respectively, in Example 1, Step A, and following the procedure described therein, the compound diphenyl chloromethylphosphonate is obtained.

Step B: (Diphenoxyphosphinyl) (Dimethoxyphosphinyl) sodium methylide

Diphenyl chloromethylphosphonate (10.0 g.) and trimethyl phosphite (25 ml.) are heated for five hours at 100° C. to 110° C., until the evolution of methyl chloride ceases. Excess trimethyl phosphite is then removed by evaporation in vacuo to afford (diphenoxyphosphinyl) (dimethoxyphosphinyl)methane and the entire sample is added to a suspension of one equivalent or slightly less of sodium hydride in dried benzene (100 ml.) over 45 minute period at 35° C. and the reaction mixture is stirred for one hour at 25° C. to yield (diphenoxyphosphinyl) (dimethoxyphosphinyl) sodium methylide.

Step C: Diphenyl (cis-1,2-epoxypropyl)phosphonate

To the solution of (diphenoxyphosphinyl) (dimethoxyphosphinyl) sodium methylide obtained according to Step B is added an equimolar amount of acetaldehyde at 20° C. to 30° C. over a 40 minute period. The mixture is held at 65° C. for 15 minutes, cooled to 15° C. and decanted from insoluble sodium salts which are washed twice with benzene. The combined benzene portions are then concentrated in vacuo to yield a mixture of diphenyl propenylphosphonate and diphenyl (cis-1,2-epoxypropyl)phosphonate which are separated by vacuum distillation.

EXAMPLE 5.—(CIS-1,2-EPOXYPROPYL)PHOSPHONIC ACID AND CALCIUM SALT

Step A: Di-n-butyl chloromethylphosphonate

By substituting n-butyl alcohol for the ethanol recited in Example 1, Step A, and following the procedure described therein the compound di-n-butyl (cis-1,2-epoxypropyl)phosphonate is obtained.

Step B: (Di-n-butyloxyphosphinyl)triphenylphosphonium methylide

A mixture of di-n-butyl chloromethylphosphonate (0.1 mole) and triphenylphosphine (0.1 mole) in 100 ml. of benzene is kept at 50° C. for 12 hours whereupon a crystalline material identified as (di-n-butyloxyphosphinylmethyl)triphenylphosphonium chloride is obtained. The intermediate thus obtained is then filtered, washed and dried and the (di-n-butyloxyphosphinylmethyl)triphenyl-phosphonium chloride (10.0 g.) is treated with an equivalent of sodium methylsulfonylmethylide in dimethylsulfoxide (150 ml.) to yield (di-n-butyloxyphosphinyl)triphenylphosphonium methylide.

Step C: Di-n-butyl (cis-1,2-epoxypropyl)phosphonate

To the solution of (di-n-butyloxyphosphinyl)triphenylphosphonium methylide obtained according to Step B, is added at 10° C. to 20° C. an equivalent amount of acetaldehyde over three hours with stirring. The solvent is removed in vacuo, the residue is treated with ice water, triphenyl phosphine oxide is removed by filtration and the filtrate is extracted three times with ether. After drying over sodium sulfate, the ether is evaporated whereupon a mixture of di-n-butyl propenyl-phosphonate and di-n-butyl (cis-1,2-epoxypropyl)phosphonate is obtained, which mixture is then separated by vacuum distillation to yield di-n-butyl (cis-1,2-epoxypropyl)phosphonate.

Step D: (Cis-1,2-epoxypropyl)phosphonic acid and calcium salt

A solution of di-n-butyl (cis-1,2-epoxypropyl)phosphonate (1 ml. mole) in trimethylchlorosilane (10 cc.) is refluxed for eight hours. The reaction mixture is then extracted with water to yield an aqueous solution of (cis-1,2-epoxypropyl)phosphonic acid and the product thus obtained is treated with two equivalents of calcium hydroxide and the solution evaporated to yield the calcium salt of (cis-1,2-epoxypropyl)phosphonic acid.

In a manner similar to that described in Example 3, all of the products of this invention may be obtained simply by substituting the appropriate starting materials for those described in Steps A–D of that example. The following equation illustrates the reaction of Example 3, Steps A, B, C and D and, in conjunction with Table I, infra, describe the several varieties of alcohols and other reagents which may be employed in the process of this invention to yield the desired (cis-1,2-epoxypropyl)phosphonic acid product and the salts and ester derivatives thereof.

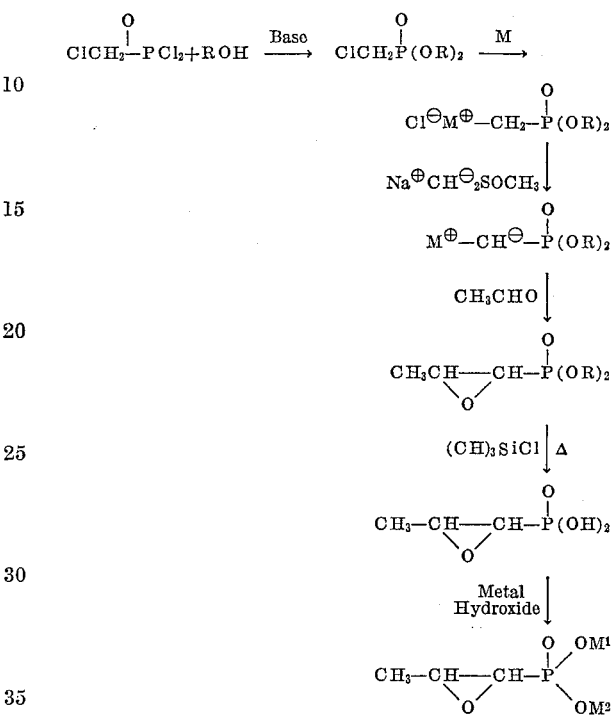

| Example | R | M | M+ | M¹ | M² | Metal hydroxide |
|---|---|---|---|---|---|---|
| 6 | —CH₂—CH=CH₂ | S(C₂H₅)₂ | —S⊕(C₂H₅)₂ | K | K | KOH |
| 7 | —(CH₂)₂—⌬ | N[(CH₂)₃CH₃]₃ | —N⊕[(CH₂)₃CH₃] | Li | Li | LiOH |
| 8 | —CH₂—⌬⌬ | S[(CH₂)₄CH₃]₂ | —S⊕[(CH₂)₄CH₃]₂ | Na | Na | NaOH |
| 9 | —(CH₂)₄CH₃ | SO(CH₃)₂ | —S⊕O(CH₃)₂ |  | —Mg— | Mg(OH)₂ |
| 10 | —CH(CH₃)₂ | N(C₂H₅)₃ | —N⊕(C₂H₅)₃ | Na | Na | NaOH |
| 11 | —CH₂—⌬ | P(O—⌬)₃ | —P⊕(O—⌬)₂ |  | —Ca— | Ca(OH)₂ |
| 12 | —C₂H₅ | P(OCH₂—⌬)₃ | —P⊕(OCH₂—⌬)₂ | Na | Na | NaOH |
| 13 | —(CH₂)₂CH₃ | P(CH₃)₃ | —P⊕(CH₃)₃ | Li | Li | LiOH |
| 14 | —CH₂—CH=CH₂ | P(CH₂—⌬)₃ | —P⊕(CH₂—⌬)₃ |  | —Mg— | Mg(OH)₂ |
| 15 | —CH(CH₃)₂ | N(CH₂—⌬)₃ | —N⊕(CH₂—⌬)₃ | K | K | KOH |
| 16 | —CH₃ | S—(⌬)₂ | —S⊕(⌬)₂ | Na | Na | NaOH |
| 17 | —O—⌬ | S—(CH₂—⌬)₂ | —S⊕(CH₂—⌬)₂ | K | K | KOH |
| 18 | —C₂H₅ | SO(⌬)₂ | —S⊕O(⌬)₂ | Li | Li | LiOH |
| 19 | —CH₃ | SO(CH₂—⌬)₂ | —SO⊕(CH₂—⌬)₂ | Na | Na | NaOH |

The products of this invention can be administered in a wide variety of therapeutic dosages in conventional vehicles as, for example, by oral administration in the form of a capsule or tablet or in a liquid solution or suspension. Suitable formulations may include diluents, granulating agents, preservatives, binders, flavoring agents and coating agents which are well known to those skilled in this particular art and the dosage of the products may be varied over a wide range as, for example, in the range of from 1.0 gram to about 8.0 grams of active ingredient for the symptomatic adjustment of the dosage to the patient to be treated.

Alternatively, the instant products (I) may be administered parenterally by injection in a sterile excipient and for this purpose it is most desirable to employ a salt of (cis-1,2-epoxypropyl)phosphonic acid which is soluble in the liquid vehicle.

It is also within the scope of this invention to combine two or more of the instant products in a unit dosage form or to combine one or more of the instant products with other known antibacterial agents.

The following example illustrates the preparation of a representative dosage; it being understood that other salts of (cis-1,2-epoxypropyl)phosphonic acid and other pharmaceutical vehicles may be substituted for the active ingredient and excipients recited therein to obtain other suitably active dosage forms:

EXAMPLE 20

Tablets containing 352.5 mg. of active ingredient per tablet

|  | Per tablet, mg. |
|---|---|
| Calcium (±) cis - 1,2 - epoxypropyl)-phosphonate | 352.5 |
| Dicalcium phosphate | 180 |
| Lactose U.S.P. | 179.5 |
| Cornstarch | 80 |
| Magnesium stearate | 8 |
|  | 800.0 |

The calcium (±) (cis-1,2-epoxypropyl)phosphonate is blended with dicalcium phosphate, lactose and 40 mg. of cornstarch. The mixture is then granulated with a 15% cornstarch paste, rough-screened, dried at 45° C. and screened through a No. 16 screen. Additional cornstarch (40 mg.) and magnesium stearate are added and the mixtuer compressed into one-half inch diameter tablets each weighing about 800 mg.

By substituting 330 mg. of disodium (±) (cis - 1,2-epoxypropyl)phosphonate monohydrate for the disodium (±) (cis-1,2-epoxypropyl)phosphonate of the above example and otherwise following the procedure described therein a similar tablet suitable for oral administration is obtained.

It will be apparent from the foregoing description that the (cis-1,2-epoxypropyl)phosphonic acid products (I) of this invention constitute a valuable class of compounds which have not been prepared heretofore. One skilled in the art will also appreciate that the process disclosed in the above examples are merely illustrative and are capable of a wide variation and modification without departing from the spirit of this invention.

What is claimed is:

1. A compound having the formula:

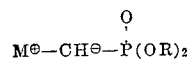

wherein R is lower alkyl, lower alkenyl, phenyl, naphthyl, benzyl, phenethyl or menaphthyl and $M^{\oplus}$ is di-lower alkoxyphosphinyl, diphenoxyphosphinyl, dibenzyloxyphosphinyl, a sulfonium cation of the formula: $(R^1)_2S^{\oplus}$—, a sulfoxonium cation of the formula: $(R^1)_2SO^{\oplus}$—, a phosphonium cation of the formula: $(R^1)_3P^{\oplus}$—, or an ammonium cation of the formula: $(R^2)_3N^{\oplus}$—, wherein $R^1$ in each occurrence is lower alkyl, phenyl, benzyl- or naphthyl and $R^2$ is lower alkyl or benzyl.

2. A compound according to claim 1 wherein R is lower alkyl.

3. A compound according to claim 1 wherein R is lower alkyl and $M^{\oplus}$ is di-lower alkoxyphosphinyl.

4. A compound according to claim 1 wherein R is lower alkyl and $M^{\oplus}$ is a di-lower alkylsulfonium cation.

5. A compound according to claim 1 wherein R is lower alkyl and $M^{\oplus}$ is a tri-lower alkylammonium cation.

6. A compound according to claim 1 wherein R is lower alkyl and $M^{\oplus}$ is a di-lower alkylsulfoxonium cation.

7. A compound according to claim 1 wherein R is lower alkyl and $M^{\oplus}$ is a tri-phenylphosphonium cation.

8. A compound having the formula:

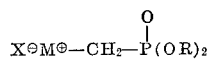

wherein R is lower alkyl, lower alkenyl, phenyl, naphthyl, benzyl, phenethyl or menaphthyl, $M^{\oplus}$ is di-lower alkoxyphosphinyl, diphenoxyphosphinyl, dibenzylphosphinyl, a sulfonium cation of the formula: $(R^1)_2S^{\oplus}$—, a sulfoxonium cation of the formula: $(R^1)_2SO^{\oplus}$—, a phosphonium cation of the formula: $(R^1)_3P^{\oplus}$—, or an ammonium cation of the formula: $(R^2)_3N^{\oplus}$—, where $R_1$ in each occurrence is lower alkyl, penyl, benzyl or naphthyl, $R^2$ is lower alkyl or benzyl and $X^{\ominus}$ is a halo anion.

9. A compound according to claim 8 wherein R is lower alkyl.

References Cited

UNITED STATES PATENTS

| 2,847,442 | 8/1958 | Sallmann | 260—945 |
| 2,980,581 | 4/1961 | Schrader | 260—968 XR |
| 3,409,707 | 11/1968 | Grayson et al. | 260—931 |

CHARLES B. PARKER, Primary Examiner

A. H. SUTTO, Assistant Examiner

U.S. Cl. X.R.

260—348 R, 543 P, 945, 947, 961, 968, 969, 983, 986; 424—203